United States Patent [19]

Shibata et al.

[11] Patent Number: 4,743,985
[45] Date of Patent: May 10, 1988

[54] IN A VIDEO TAPE RECORDER HAVING ROTARY RECORDING, AUXILIARY AND ERASING HEADS, A CIRCUIT FOR SHORT CIRCUITING THE AUXILIARY HEAD DURING ERASING

[75] Inventors: Masahiro Shibata, Tokyo; Tatsuo Tsujibayashi; Hiroyuki Sato, both of Kanagawa; Yoshinori Machida, Tokyo, all of Japan

[73] Assignee: Sony, Tokyo, Japan

[21] Appl. No.: 870,184

[22] Filed: Jun. 3, 1986

[30] Foreign Application Priority Data

Jun. 19, 1985 [JP] Japan .................. 60-133279

[51] Int. Cl.⁴ .................. G11B 15/12; G11B 15/14
[52] U.S. Cl. .................. 360/61; 360/64
[58] Field of Search .................. 360/19.1, 61, 64

[56] References Cited

U.S. PATENT DOCUMENTS

| 4,364,098 | 12/1982 | Hirota et al. | 360/64 |
| 4,396,954 | 8/1983 | Sonoda et al. | 360/64 |
| 4,428,008 | 1/1984 | Fawkes | 360/61 |
| 4,466,026 | 8/1984 | Miura et al. | 360/61 |
| 4,520,405 | 5/1985 | Sasaki et al. | 360/64 |
| 4,542,419 | 9/1985 | Morio et al. | 360/64 |
| 4,551,771 | 11/1985 | Machida et al. | 360/19.1 |

FOREIGN PATENT DOCUMENTS 0119506  7/1984  Japan ..................... 360/64

Primary Examiner—Raymond F. Cardillo
Assistant Examiner—Surinder Sachar
Attorney, Agent, or Firm—Lewis H. Eslinger

[57] ABSTRACT

A video tape recorder for recording a plurality of skewed recording tracks on a video tape includes a recording head, an auxiliary head and an erasing head mounted on a rotary body of a tape guide drum about which the tape is helically wrapped, a rotary transformer for transmitting signals to the recording head, auxiliary head and erasing head rotating with the rotary body, an erase signal generator for generating an erasing signal to be supplied to the erasing head by way of the rotary transformer, and a short circuit arrangement coupled to a signal path connected with the auxiliary head for short circuiting the latter upon applying the erasing signal form the erase signal generator to the erasing head by way of the rotary transformer.

1 Claim, 4 Drawing Sheets

IN A VIDEO TAPE RECORDER HAVING ROTARY RECORDING, AUXILIARY AND ERASING HEADS, A CIRCUIT FOR SHORT CIRCUITING THE AUXILIARY HEAD DURING ERASING

BACKGROUND OF THE INVENTION

1. Field of the Invention

The present invention relates generally to recording and/or reproducing apparatus and, more particularly, is directed to improvements in a video tape recorder.

2. Description of the Prior Art

Standardization of a so-called 8 mm video tape recorder has been proposed. According to such standardization represented generally in U.S. Pat. No. 4,551,771 having a common assignee herewith, and as shown in FIG. 1 hereof, the recording and/or reproducing of a video signal on and/or from magnetic tape TP is carried out by first and second rotary magnetic heads H1 and H2 which are mounted on a rotary tape guide drum RD at respective locations having an angular spacing of 180° therebetween. The magnetic tape TP is helically wrapped around the periphery of the tape guide drum over an angular range of 221° by guide pins G1 and G2 and is normally transported longitudinally in the direction of the arrow t. In an interval of 180° within the tape wrapping angle of 221°, the video signal is normally recorded on and/or reproduced from the magnetic tape TP by heads H1 and H2 alternately while rotating in the direction of the arrow d. In the remaining interval of 36°, an audio signal, which is pulse-code-modulated and time-base-compressed, is recorded on and/or reproduced from the magnetic tape TP by the same rotary heads H1 and H2.

The azimuth angles of the head gaps of the first and second rotary heads H1 and H2 are made different from each other in a range of ±10°. In the proximity of the second rotary head H2, there is provided an auxiliary rotary magnetic head H3 which is used for playback when the tape speed is other than the standard tape speed for recording. The auxiliary head H3 is desirably spaced apart from the second rotary head H2 in the circumferential direction by a distance corresponding to two horizontal periods on magnetic tape TP. The rotary head H3 is shown to precede the head H2 considering the direction of rotation d. The azimuth of the head gap of the auxiliary rotary magnetic head H3 is selected to be the same as the azimuth of the head gap of the first rotary magnetic head H1. The gap width of the auxiliary rotary magnetic head H3 is selected to be slightly larger than that of the second rotary head H2.

Further, an erasing rotary magnetic head He is mounted on rotary drum RD at a location spaced angularly by 90° relative to first and second rotary magnetic heads H1 and H2. The gap width of this erasing rotary head He corresponds to the combined width of two skewed recording tracks.

As shown on FIG. 2, on the tape TP, there are recorded a frequency-modulated video signal and a PCM (pulse-code-modulated) audio signal in each of a succession of slant or skewed tracks T1,T2,T3,T4, . . . , each having a length corresponding to the wrapping angle of 221°, and which are formed by the first and second rotary heads H1 and H2 alternately. In an overscan section or area AP of each of the skewed tracks T1,T2, . . . , having a length corresponding to an angular range of 36° starting from the point where the respective rotary head H1 or H2 starts scanning the track, there is recorded the PCM audio signal corresponding to one field period of the video signal, but with the time base of such audio signal being compressed. In the succeeding area AV of the track having a length corresponding to an angular range of 180°, there is recorded by the head H1 or H2 a color video signal of one field period. Finally, at the trailing end portion or area AV of each track having a length corresponding to an angular range of 5°, there is provided a separating portion SP.

Alternatively, and as disclosed in detail in U.S. Pat. No. 4,542,419 which also has a common assignee herewith, it is possible to establish a so-called audio-use mode in which the area AV of each track corresponding to the angular range of 180° is divided equally by 5 and the PCM audio signal is recorded in a selected one of these divided portions during scanning of each track. Specifically, as shown in FIG. 3, the whole area of each track, including the area AP and the area AV, is divided into 6 segments S1 to S6 each corresponding to an angular range of 36°, and first to sixth track channels are formed by the same numbered segments of the respective skewed tracks T1,T2,T3,T4, . . . , whereby the PCM audio signal can be recorded in any desired track channel. For example, the PCM audio signal may be recorded first in the segments S1 of the successive tracks T1,T2,T3,T4, . . . , TN from one end of the tape to the other. Thereafter, the audio signal may be further recorded in segments S2 of the successive tracks from one end of the tape to the other. In such case, since the PCM audio signal is recorded in each channel with the drum servo and the capstan servo being effected at every same numbered segment of each skewed track, segment tracks ST1 to ST6 (FIG. 4) corresponding to the respective segments S1 to S6 may be scattered relative to both sides of a straight line corresponding to the longitudinal median of a skewed track formed during the normal video and audio recording described in connection with FIG. 2.

A flat type rotary transformer apparatus RTA (FIG. 5) is employed for transmitting signals to and from the rotary heads H1,H2,H3 and He. Such rotary transformer apparatus generally includes two relatively rotatable half-bodies. As shown on FIG. 5, each of such half-bodies includes a magnetic substrate BS of a disc-type saucer-shape and a circular opening CP is formed at the center of this magnetic substrate BS. Concentric, radially spaced primary or secondary windings L1,L2,L3 and Le of respective rotary transformer sections are connected to first and second rotary heads H1 and H2, auxiliary rotary head H3 and erasing rotary head He, respectively. The primary or secondary windings L1,L2,L3 and Le are sequentially arranged on substrate BS from the outer periphery to the inner periphery of the latter. In the case of the 8 mm video tape recorder, in order to miniaturize the apparatus, rotary transformer apparatus RTA is made as small as possible. For this reason, a so-called short ring SR which establishes a magnetic shield between adjacent windings is only provided between windings L1 and L2 and windings L2 and L3.

Thus, in the rotary transformer apparatus RTA of the conventional 8 mm video tape recorder, a short ring SR is not provided between windings L3 and Le to which the auxiliary rotary head H3 and the erasing rotary head He are respectively connected so that, when an erasing signal (AC signal) is supplied to the erasing rotary head He, such erasing signal is leaked through the rotary transformer apparatus to winding L3 associated with the auxiliary rotary head H3. Hence, it is possible that the magnetized pattern of the information signal previously recorded on a skewed track will be demagnetized by the auxiliary rotary head H3. Such demagnetization will cause the S/N (signal-to-noise) ratio of a reproduced signal to be lowered.

The foregoing problem will be first described more fully with reference to FIG. 6 which illustrates the situation when, in the recording mode of the video tape recorder, erasing rotary head He is employed to erase the skewed tracks, two at a time, along the entire lengths thereof for preparing such tracks for the subsequent recording of a PCM audio signal and a video signal in the areas AP and AV, respectively, of each such track. In that case, at the hatched regions R1 and R2 extending along the overlapping areas of the skewed tracks T1 and T2 and the skewed tracks T3 and T4, the magnetized pattern of the information signal previously recorded in a skewed track is demagnetized by the leaked erasing signal acting in auxiliary rotary head H3. For example, when skewed tracks T3 and T4 are being erased simultaneously by erasing rotary head He shown in broken lines on FIG. 6, the skewed track T2 is demagnetized by the auxiliary head H3 which is in advance of the erasing head He considering the direction of rotation d of the rotary heads. Immediately after the demagnetization of track T2 by auxiliary head H3, the closely following second rotary head H2 records an information signal, that is, an audio signal and then a video signal, in the areas AP and AV of track T2. However, as earlier noted and as shown on FIG. 6, the gap of auxiliary head H3 is slightly wider than the gap of second rotary head H2, with the result that the narrow region R1 in track T1 extending along the left-hand side of track T2 remains demagnetized after recording by rotary head H2 in track T2. Similarly, when the next pair of skewed tracks after the track T3 and T4 are erased, the narrow region R2 in track T3 extending along the left-hand side of track T4 will be demagnetized. It will be appreciated that a similar demagnetized region will appear in every other track at the completion of a recording operation.

FIG. 7 illustrates the situation when, in the recording mode, only the area AP is erased by the erasing rotary head He in order to record the PCM audio signal in the area AP of each skewed track. In that case, the video signal remains in the area AV and the video signal is not recorded again in the area AV after being erased so that, during the period in which the area AP is erased by erasing rotary head He, the magnetized pattern of the video signal on a part of the area AV is demagnetized over the whole width of each of the alternate skewed tracks T2,T4, . . . , as shown by the hatched areas R3,R4 on FIG. 7, by the leaked erasing signal acting in auxiliary rotary head H3 which, of course, only scans such alternate tracks in advance of rotary head H2.

It will be appreciated that a similar problem arises when PCM audio signals are recorded in the several track channels, as shown on FIG. 4, and a suitably timed erasing signal is supplied to erasing rotary head He for erasing the audio signal recorded in a selected one of the segments S1-S6 in each skewed track prior to the re-recording of a PCM audio signal in that selected segment of each track. In that case too, a segment of each of the alternate tracks T2,T4, . . . , scanned by auxiliary rotary head H3 in advance of rotary head H2 will be demagnetized by auxiliary head H3 in response to the leakage of the erasing signal thereto. However, the track segment which is demagnetized will be spaced from the selected track segment being erased by a distance corresponding to the approximately 90° angular spacing between heads H3 and He.

OBJECTS AND SUMMARY OF THE INVENTION

Accordingly, it is an object of this invention to provide an improved video tape recorder for avoiding the previously described problems encountered in the prior art video tape recorder.

Another object of this invention is to provide a video tape recorder in which at least one recording rotary head, a reproducing rotary head and an erasing rotary head have respective signals transmitted thereto through a common rotary transformer apparatus and which can prevent demagnetizing of a magnetized pattern representing an information signal recorded on a recording track on a magnetic tape by a reproducing rotary head to which an erasing signal is leaked through the rotary transformer apparatus when the erasing rotary head is energized.

A further object of this invention is to provide a video tape recorder, as aforesaid, which is suitable for a so-called 8 mm video tape recorder.

According to an aspect of the present invention, a helical scan tape recorder for recording signals in a plurality of skewed recording tracks on a record tape is provided with recording head means; auxiliary head means; erasing head means; tape guide means including a rotary body having the record tape wrapped on the periphery thereof and carrying said recording head means, auxiliary head means and erasing head means; rotary transformer means for transmitting signals to said recording head means, auxiliary head means and erasing head means rotating with said rotary body; erase signal generating means for generating an erase signal to be supplied to said erasing head means by way of said rotary transformer means; and short circuit means coupled to a signal path connected with said auxiliary head means for short circuiting the latter upon applying said erase signal from said erase signal generating means to said erasing head means by way of said rotary transformer means.

The above, and other objects, features and advantages of the present invention, will become apparent from the following detailed description of a preferred embodiment which is to be read in conjunction with the accompanying drawings, throughout which like reference numerals designate like elements and parts.

DESCRIPTION OF THE PREFERRED EMBODIMENT

Figure 1:
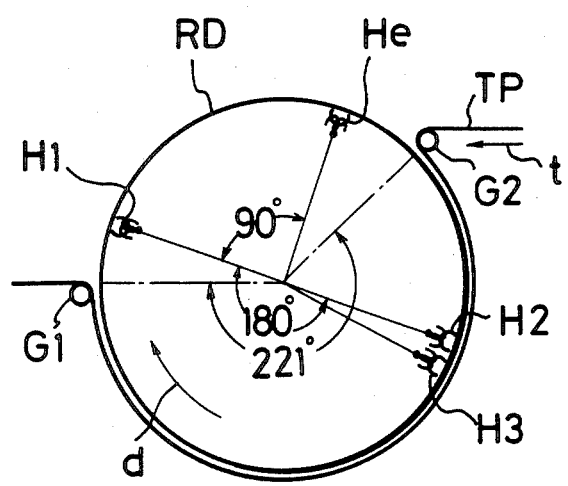
FIG. 1 is a schematic diagram showing a tape guide drum and associated heads of a known 8 mm video tape recorder.
Figure 2:
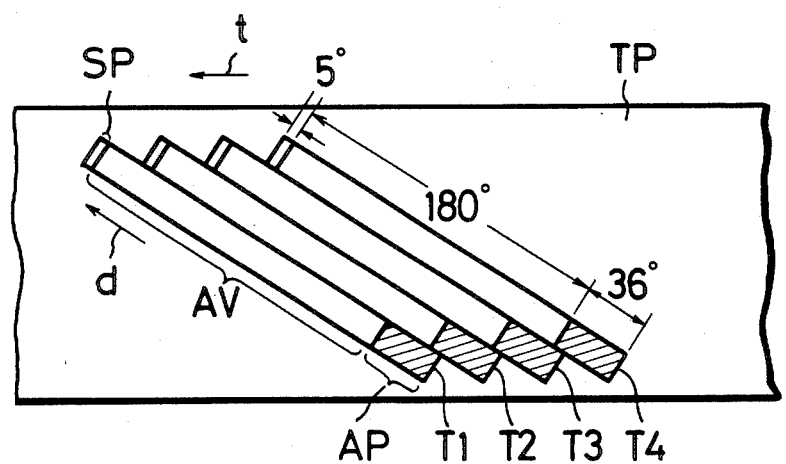
FIGS. 2,3 and 4 are diagrammatical representations showing respective recorded track patterns that may be provided on a magnetic tape using the 8 mm video tape recorder of FIG. 1.
Figure 3:
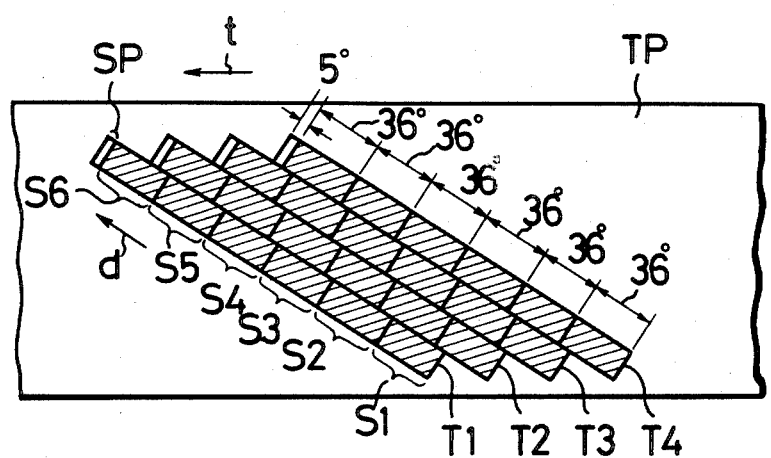
Figure 4:
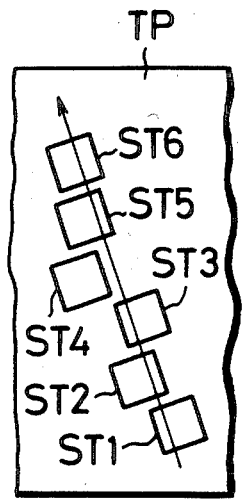
Figure 5:
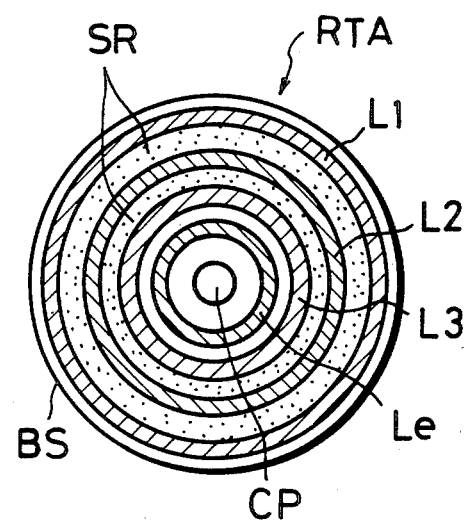
FIG. 5 is a plan view showing a part of a rotary transformer apparatus used for transmitting signals to the heads shown on FIG. 1.
Figure 6:
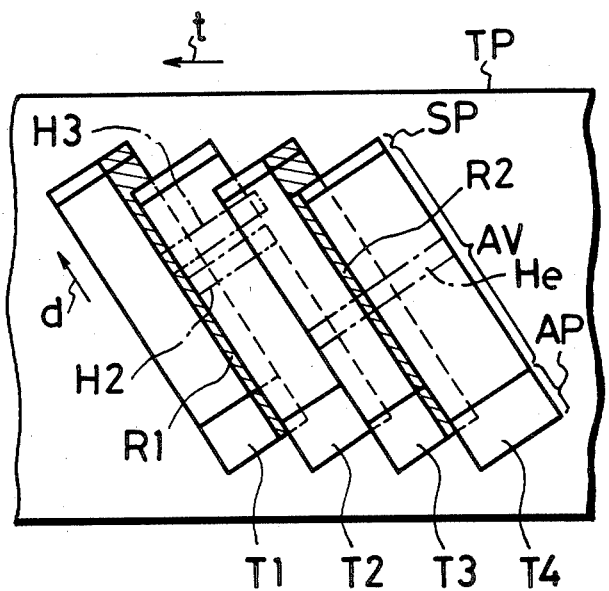
FIGS. 6 and 7 are diagrammatical representations showing track patterns formed on a tape used in the 8 mm video tape recorder of FIG. 1 and to which reference is made in explaining problems to be overcome by the invention.
Figure 7:
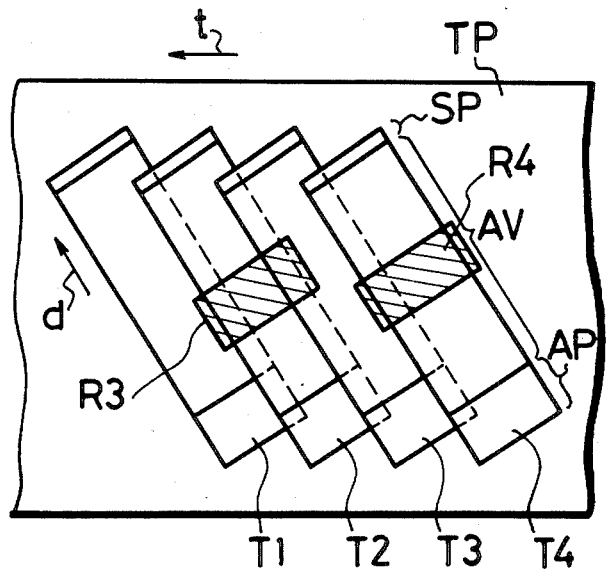
Figure 8:
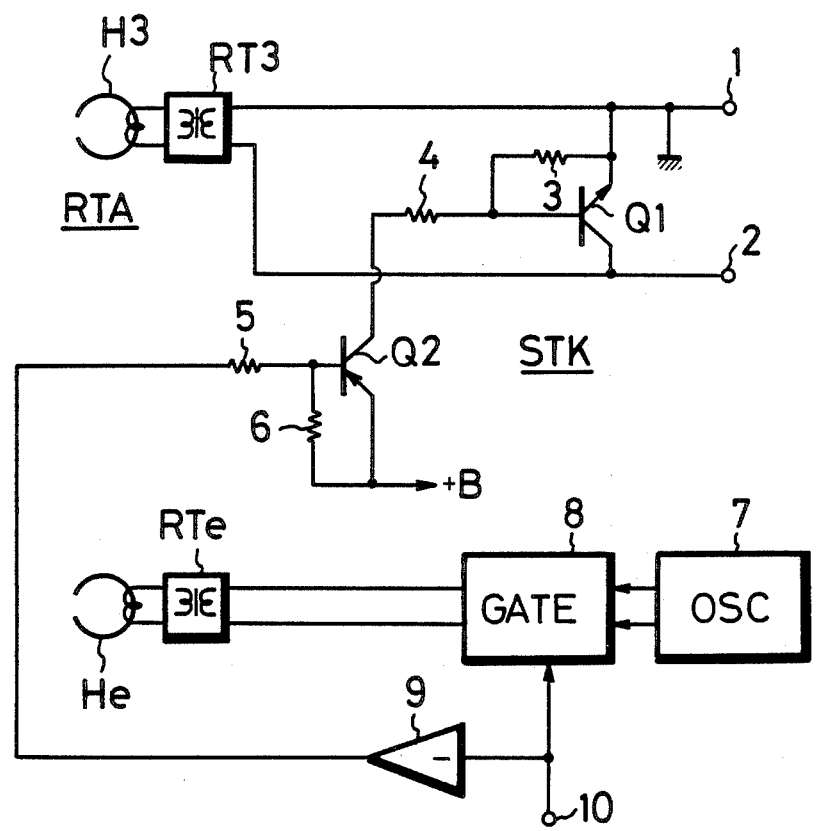
FIG. 8 is a circuit diagram showing an embodiment of a video tape recorder according to the present invention.

Referring in detail to FIG. 8, it will be seen that the present invention is there shown applied to an 8 mm video tape recorder having its heads arranged as previously described with reference to FIG. 1, and an oscillator 7 is provided to generate an erasing signal. The erasing signal (oscillation signal) from oscillator 7 is supplied through a gate circuit 8 and a rotary transformer section RTe of a rotary transformer apparatus RTA to the erasing rotary head He. The timing at which gate circuit 8 is turned on or enabled is controlled by an erase timing control signal suitably supplied to an input terminal 10. The auxiliary rotary head H3 is connected through another rotary transformer section RT3 of rotary transformer apparatus RTA to an output terminal 1 (grounded) and to an output terminal 2.

Generally, in accordance with this invention, a short circuit section STK is provided to substantially short circuit auxiliary rotary magnetic head H3 whenever erasing rotary head He is energized. This short circuit section STK is connected between the ends of the secondary winding of rotary transformer section RT3, that is, between output terminals 1 and 2.

More particularly, in short circuit section STK, the collector-emitter path of an NPN-type transistor Q1 is connected between output terminals 2 and 1. A resistor 3 is connected between the base and the emitter of transistor Q1. The collector of a PNP-type transistor Q2 is connected through a resistor 4 to the base of transistor Q1. The emitter of transistor Q2 is connected to a power supply source +B (5 volts). A resistor 6 is connected between the base and emitter of transistor Q2. The erase timing control signal applied to input terminal 10 is supplied through a phase-inverting circuit 9 and a resistor 5 to the base of transistor Q2.

The operation of the circuit described above with reference to FIG. 8 will now be described. When the control signal supplied to input terminal 10 is at a high level so as to turn on or enable gate circuit 8, the erasing signal from oscillator 7 is supplied through gate circuit 8 and rotary transformer section RTe to erasing rotary head He which then erases predetermined portions of the skewed tracks.

The control signal applied to input terminal 10 is phase-inverted by phase inverting circuit 9 and then applied through resistor 5 to the base of transistor Q2 so that this transistor Q2 is turned on. As a result, the transistor Q1 is also turned on and thereby the secondary winding of rotary transformer section RT3 is short-circuited. Accordingly, even if the erasing signal, which is intended to be supplied only to erasing rotary head He, is leaked through the rotary transformer apparatus RTA to auxiliary rotary magnetic head He, the short-circuiting of the secondary winding of rotary transformer section RT3 by transistor Q1 ensures that the magnetized pattern of the information signal recorded on a skewed track and which is to be retained, will not be inadvertently or erroneously demagnetized by the auxiliary rotary magnetic head H3.

Although the above-described embodiment of the invention short circuits the secondary winding of rotary transformer section RT3, it is possible alternatively to provide the short circuit section SKT at the primary winding side of rotary transformer section RT3.

According to the present invention as described above, it is possible to avoid leakage of the erasing signal for the erasing rotary head He through the rotary transformer apparatus to a reproducing rotary head H3 with consequent undesired demagnetizing of the magnetized pattern of the information signal recorded in a recording track on the tape. Therefore, it is possible to avoid reduction of the S/N ratio of the reproduced signal.

Although a preferred embodiment of the invention has been described in detail herein with reference to the accompanying drawings, it is to be understood that the invention is not limited to that precise embodiment, and that many modifications and variations could be effected therein by one skilled in the art without departing from the spirit or scope of the invention as defined in the appended claim.

What is claimed is:

1. A helical scan tape recorder for recording signals in a plurality of skewed recording tracks on a record tape comprising: recording head means; auxiliary head means; erasing head means; tape guide means including a rotary body having the record tape wrapped on the periphery thereof, said rotary body carrying said recording head means, auxiliary head means and erasing head means; rotary transformer means for transmitting signals to said recording head means, auxiliary head means and erasing head means rotating with said rotary body and including a first section associated with said erasing head means and a second section having a primary winding connected to said auxiliary head means and a stationary secondary winding having its ends connected to output terminals; erase signal generating means including oscillating means, gate means connected between said oscillating means and said first rotary transformer section for applying an oscillating output of said oscillating means as said erase signal to said erasing head means when said gate means is enabled, and means for applying an erase timing control signal to said gate means for enabling the latter; and short circuit means responsive to said erase timing control signal for short circuiting said auxiliary head means whenever said gate means is enabled for applying said erase signal from said erase signal generating means to said erasing head means by way of said rotary transformer means, said short circuit means including an NPN-type transistor having an emitter-collector path connected between said output terminals for short circuiting the auxiliary head means when said NPN-type transistor is turned on, and means for turning on said NPN-type transistor including a PNP-type transistor having an emitter-collector path connected between a power source and a base electrode of said NPN-type transistor, and inverting means for applying an inverted version of said erase timing control signal to a base electrode of said PNP-type transistor, whereby said NPN-type transistor is turned on when said erase timing control signal is at a level for enabling said gate means.

* * * * *